United States Patent
Yoshikawa et al.

(10) Patent No.: US 7,828,107 B2
(45) Date of Patent: Nov. 9, 2010

(54) FORWARD/BACKWARD MOVEMENT OPERATION DEVICE FOR WORK MACHINE

(75) Inventors: Masaki Yoshikawa, Tsuchiura (JP); Jujitsu Murota, Tsuchiura (JP); Yasuo Yamazaki, Osaka (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 728 days.

(21) Appl. No.: 10/591,916

(22) PCT Filed: Mar. 8, 2005

(86) PCT No.: PCT/JP2005/004394

§ 371 (c)(1),
(2), (4) Date: May 23, 2007

(87) PCT Pub. No.: WO2005/088169

PCT Pub. Date: Sep. 22, 2005

(65) Prior Publication Data

US 2007/0289803 A1 Dec. 20, 2007

(30) Foreign Application Priority Data

Mar. 11, 2004 (JP) ............................. 2004-069168

(51) Int. Cl.
B62D 20/00 (2006.01)
(52) U.S. Cl. ................ 180/323; 701/50; 307/10.1; 180/273; 180/336
(58) Field of Classification Search .......... 180/321, 180/323, 324, 336, 273; 307/10.1; 701/50
See application file for complete search history.

(56) References Cited

U.S. PATENT DOCUMENTS 3,991,845 A * 11/1976 LaPointe ................ 180/336

(Continued)

FOREIGN PATENT DOCUMENTS

JP 63-107135 U 7/1988

(Continued)

OTHER PUBLICATIONS

International Search Report dated Apr. 12, 2005 Including English Translation of relevant portion (Five (5) pages).

*Primary Examiner*—Ruth Ilan
(74) *Attorney, Agent, or Firm*—Crowell & Moring LLP

(57) ABSTRACT

A forward/reverse control system for a work machine cancels a second control state, in which forward/reverse switching control is performed by a second forward/reverse control means, by an operation of a first forward/reverse control means to return to a first control state in which forward/reverse switching control is performed by the first forward/reverse control means. The system is provided with a F-N-R lever unit 30 (the first forward/reverse control means) and F-N-R switch unit 40 (the second forward/reverse control means) that instruct forward, reverse or neutral, a controller 42 which performs forward/reverse switching control by giving priority to an instruction from the F-N-R lever unit 30 over an instruction from the F-N-R switch unit 40, and a selector switch 41 which by an operation of a switching control member 41a, instructs the controller 42 to switch to the second control state or to cancel the second control state. As a consequence, the system has made it possible to return to the first control state without an operation of the first forward/reverse control means.

3 Claims, 7 Drawing Sheets

U.S. PATENT DOCUMENTS

| | | | |
|---|---|---|---|
| 4,119,000 A | | 10/1978 | Venable |
| 4,398,618 A | * | 8/1983 | Hansen .................... 180/273 |
| 4,699,239 A | * | 10/1987 | Ishino et al. ............... 180/315 |
| 4,700,802 A | | 10/1987 | Fought |
| 4,949,805 A | * | 8/1990 | Mather et al. .............. 180/333 |
| 5,109,945 A | * | 5/1992 | Koga ........................ 180/273 |
| 5,419,412 A | * | 5/1995 | Schwab et al. ............. 180/336 |
| 6,450,284 B1 | * | 9/2002 | Sakyo et al. ............... 180/329 |
| 6,643,577 B1 | * | 11/2003 | Padgett et al. ............. 701/50 |
| 7,007,768 B2 | * | 3/2006 | Nishi et al. ................ 180/273 |
| 2004/0261609 A1 | * | 12/2004 | Nakada et al. .............. 91/471 |

FOREIGN PATENT DOCUMENTS

| | | |
|---|---|---|
| JP | 4-62027 U | 5/1992 |
| JP | 6-8462 U | 2/1994 |
| JP | 10-82073 A | 3/1998 |
| JP | 11-268656 A | 10/1999 |
| JP | 2002-323931 | 11/2002 |

* cited by examiner

FORWARD/BACKWARD MOVEMENT OPERATION DEVICE FOR WORK MACHINE

TECHNICAL FIELD

This invention relates to a forward/reverse control system to be arranged on a work machine which travels by wheels, such as a wheeled excavator or wheel loader. The system is provided with a first forward/reverse control means and second forward/reverse control means for instructing forward, reverse or neutral of the work machine and also with a switching instruction means for instructing a switch from a first control state in which forward/reverse switching control is performed by the first forward/reverse control means to a second control state in which forward/reverse switching control is performed by the second forward/reverse control means. By operation of the first forward/reverse control means, the second control state is cancelled to return to the first control state.

BACKGROUND ART

A work machine which travels by wheels, such as a wheeled excavator or wheel loader, is provided with a forward/reverse control system which instructs forward, reverse or neutral of the work machine. This forward/reverse control system is a F-N-R lever unit, which includes a F-N-R lever sticking out below a steering wheel toward a right or left side from a steering column and instructs forward, reverse or neutral in accordance with an operation of the F-N-R lever. The F-N-R lever can be shifted to a forward position that instructs forward, a reverse position that instructs reverse, or a neutral position that instructs neutral, and which can be held at the forward position, reverse position or neutral position.

The work machine is also provided with a front attachment control lever arranged on a console, which is disposed on a right or left side of an operator's seat, to control a front attachment.

The F-N-R lever and the front attachment control lever are arranged in a positional relation such that, when the F-N-R lever sticks out, for example, to the left side from the steering column, the front attachment control lever is disposed in a right front of the operator's seat or that, when the F-N-R lever sticks out conversely to the right side from the steering column, the front attachment control lever is disposed in a left front of the operator's seat. In other words, the F-N-R lever and the front attachment control lever are disposed such that the F-N-R lever and the steering wheel can be operated by the same one hand while the front attachment control lever can be operated by the other one hand.

Upon performing front/reverse switching in the work machine constructed as described above, an operator places one of his hands on the steering wheel and the other hand on the front attachment control lever. Upon operating the F-N-R lever, the operator hence tends to let the one hand go off the steering wheel. From the standpoint of safety, however, it is not preferred to let go off the steering wheel.

Accordingly, the conventional forward/reverse control system disclosed in JP-A-11-268656 is provided, in addition to the above-mentioned F-N-R lever unit, with another forward/reverse control means that instructs forward, reverse or neutral of the work machine and also with a switching instruction means that instructs a switch from a first control state in which forward/reverse switching control is performed by the forward/reverse lever unit to a second control state in which forward/reverse switching control is performed by the another forward/reverse control means.

The another forward/reverse control means is composed of a forward switch that instructs forward, a reverse switch that instructs reverse, and a neutral switch that instructs neutral. These switches comprise pushbutton switches equipped with self-resetting pushbuttons. A forward button as the pushbutton of the forward switch, a reverse button as the pushbutton of the reverse switch, and a neutral button as the pushbutton of the neutral switch are disposed on a top portion of the front attachment control lever.

The switching instruction means comprises a pushbutton switch equipped with a self-resetting pushbutton. The switching button as the pushbutton of the switching instruction means is disposed on a top wall of a console located in the vicinity of the front attachment control lever.

The conventional forward/reverse control system is designed such that the first control state is switched to the second control state when a switch is instructed by the switching instruction means in a state that neutral has already been instructed by the forward/reverse lever unit. In other words, the conventional forward/reverse control system holds the first control state in a state that forward or reverse has already been instructed by the forward/reverse lever unit. The conventional forward/reverse control system is also designed such that the second control state is cancelled to return to the first control state when the forward/reverse lever unit is operated in the second control state instructed by the another reverse control means. In other words, the conventional forward/reverse control system is designed such that forward/reverse switching is performed by giving priority to an operation of the forward/reverse lever unit.

With the conventional forward/reverse control system constructed as described above, forward/reverse switching of the work machine can be effected by the other hand without letting the one hand go off the steering wheel. Even when the operator operates the forward/reverse lever unit in an instant, forward and reverse can be switched to each other.

DISCLOSURE OF THE INVENTION

According to the conventional forward/reverse control system, neither a cancel of the state (the second control state) in which forward/reverse switching control is performed by the another forward/reverse control means, that is, the second forward/reverse control means nor a return to a state (the first control state) in which forward/reverse switching control is performed by the F-N-R lever unit, that is, the first forward/reverse control means is performed unless the F-N-R lever unit, that is, the first forward/reverse control means is operated. The operator may, therefore, leave the second control state as it is when no need arises to operate the first forward/reverse control means after switching to the second control state.

If an operator depresses an accelerator pedal in a state that the second control state has been left over, for example, in a state that a power transmission means has already been switched to forward or reverse by the second forward/reverse control means without coming to the operator's knowledge, for example, as a result of the operator's accidental contact to the second forward/reverse control means upon trying to operate the front attachment control lever or as a result of an erroneous operation of the second forward/reverse control means by a shifted operator after operator shifting, the work machine may perform a travel not intended by the operator.

The present invention has been completed in view of the above-mentioned circumstances, and its object is to provide a forward/reverse control system for a work machine, said system being capable of canceling a second control state, in which forward/reverse switching control is performed by a second forward/reverse control means, by an operation of a first forward/reverse control means to return to a first control state in which forward/reverse switching control is performed by the first forward/reverse control means, wherein the return to the first control state can be effected without relying upon an operation of the first forward/reverse control means.

To achieve the above-mentioned object, the present invention provides a forward/reverse control system for a work machine, said system being provided with a first forward/reverse control means and second forward/reverse control means for instructing forward, reverse or neutral of the work machine, a switching instruction means for instructing a switch from a first control state in which forward/reverse switching control is performed by the first forward/reverse control means to a second control state in which forward/reverse switching control is performed by the second forward/reverse control means, and a control means for controlling the work machine in accordance with an instruction by the first forward/reverse control means, an instruction by the second forward/reverse control means or an instruction by the switching control means, and the control means being set such that with an operation of the first forward/reverse control means, the second control state is cancelled to return to the first control state, wherein the system is provided, in addition to the first forward/reverse control means, with a cancellation instructing means for instructing a cancel of the second control state, and the control means is set such that in accordance with an instruction of a cancel by the cancellation instructing means, the second control state is cancelled to return to the first control state.

According to the present invention constructed as described above, an operation of the cancellation instructing means can cancel the second control state to return to the first control state. In other words, the second control state, in which forward/reverse switching control is performed by the second forward/reverse control means, can be cancelled to return to the first control state, in which forward/reverse switching control is performed by the first forward/reverse control means, by the cancellation instructing means without relying upon an operation of the first forward/reverse control means.

The present invention can also be characterized in that in the above-described invention, the first forward/reverse control means comprises a control lever unit having a control lever which can be shifted to a forward position that instructs forward, a reverse position that instructs reverse, or a neutral position that instructs neutral and which can be held at the forward position, reverse position or neutral position; the second forward/reverse control means comprises a switch unit having a control member which can be switched to a forward position that instructs forward, a reverse position that instructs reverse or a neutral position that instructs neutral and which can be held at the forward position, reverse position or neutral position; the switching instruction means comprises another switch unit comprising the cancellation instructing means and another control member which be switched to a switching state in which a switch from the first control state to the second control state is instructed or to a cancellation state in which a cancel of the second control state is instructed and which can be held in the switching state or cancellation state; the control means is set such that, when neutral has been already instructed by both of the first forward/reverse control means and the second forward/reverse control means upon switching of the switching instruction means to the switching state, the first control state is switched to the second control state; and the switching instruction means is set such that, upon switching to the first control state by an operation of the first forward/reverse control means with the switching instruction means having been already switched to the switching state, any instruction by the switching instruction means is cancelled until the switching instruction means is switched to the cancellation state.

According to the present invention constructed as described, a switch from the first control state to the second control state is performed by the control means when neutral has already been instructed by the second forward/reverse control means upon instruction of a switch by the switching instruction means. Insofar as the control member for the second forward/reverse control means has already been held at the forward position or reverse position, it is thus possible to avoid a switch from the first control state to the second control state even when the another control member for the switching instruction means is switched to the switching state.

In the present invention, when switched to the first control state as a result of an operation of the first forward/reverse control means with the switching instruction means having already been switched to the switching state, any instruction by the switching instruction means is cancelled until the switching instruction means is switched to the canceling state by the control means. In other words, after being switched to the first control state in a state that the another control member for the switching instruction means has been already held in the switching state, no switching instruction becomes effective unless the another control member for the switching instruction means is switched again to the switching state subsequent to its switch to the cancellation state. As a consequence, it is possible to avoid a switch to the second control state even by a switch of the first forward/reverse control means to the neutral position when the switching instruction means is in a state already switched to the switching state and the control state is the first control state.

The present invention can also be characterized in that in the above-described invention, the second forward/reverse control system is provided with a use determination means for determining whether or not the second forward/reverse control means is in use; and the control means is set such that, when the switching instruction means is in a state already switched to the switching state and the second forward/reverse control means is not determined to be in use by the use determination means, the second control state is cancelled to return to the first control state.

According to the present invention constructed as described above, when the second forward/reverse control means becomes unused while the second control state is not cancelled by the switching instruction means (the cancellation instructing means), the second forward/reverse control means is not determined to be in use by the use determination means, and as a result, the control state returns from the second control state to the first control state by the control means. It is, therefore, possible to have the control state returned from the second control state to the first control state when the second control state is left over.

The present invention can also be characterized in that in the above-described invention, the use determination means comprises a seat occupancy detection means for detecting whether or not an operator is in occupancy of an operator's seat, and determines that the second forward/reverse control means is not in use when no seat occupancy is detected by the seat occupancy detection means.

According to the present invention constructed as described above, it is possible to determine that the second forward/reverse control means is not in use when no seat occupancy is detected by the seat occupancy detection means. It is, therefore, possible to have the control state returned to the first control state when the second control state is left over in a state that the operator is not in occupancy of the operator's seat, for example, when operator shifting is effected in a state that the second control state is left over.

As has been described above, the present invention makes it possible to cancel the second control state, in which forward/reverse switching control is performed by the second forward/reverse control means, and to return the first control state, in which forward/reverse switching control is performed by the first forward/reverse control means, by an operation of the cancellation instructing means without relying upon an operation of the first forward/reverse control means. In other words, even in the absence of such a situation that forward/reverse switching of the work machine is performed by the first forward/reverse control means, the inclusion of the cancellation instruction means can induce the cancellation of the second control state, thereby making it possible to avoid any travel which would otherwise occur as a result of a careless operation of the second forward/reverse control means.

BEST MODES FOR CARRYING OUT THE INVENTION

Figure 1:
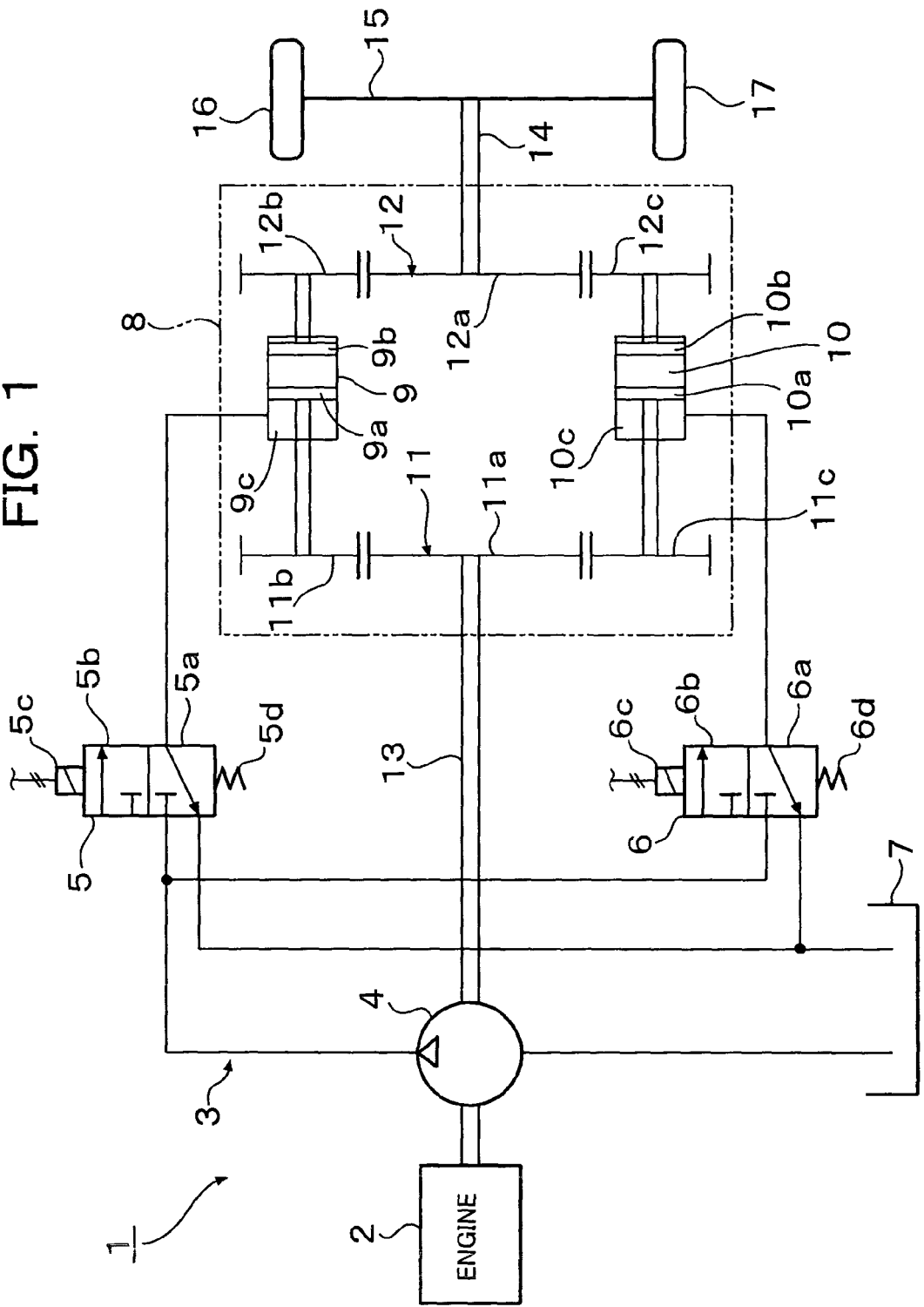
FIG. 1 is a diagram showing the outline of an undercarriage of a work machine to be controlled by a first embodiment of the present invention.

Referring to the drawings, a description will hereinafter be made about embodiments of the forward/reverse control system according to the present invention for a work machine.

First Embodiment

Figure 2:
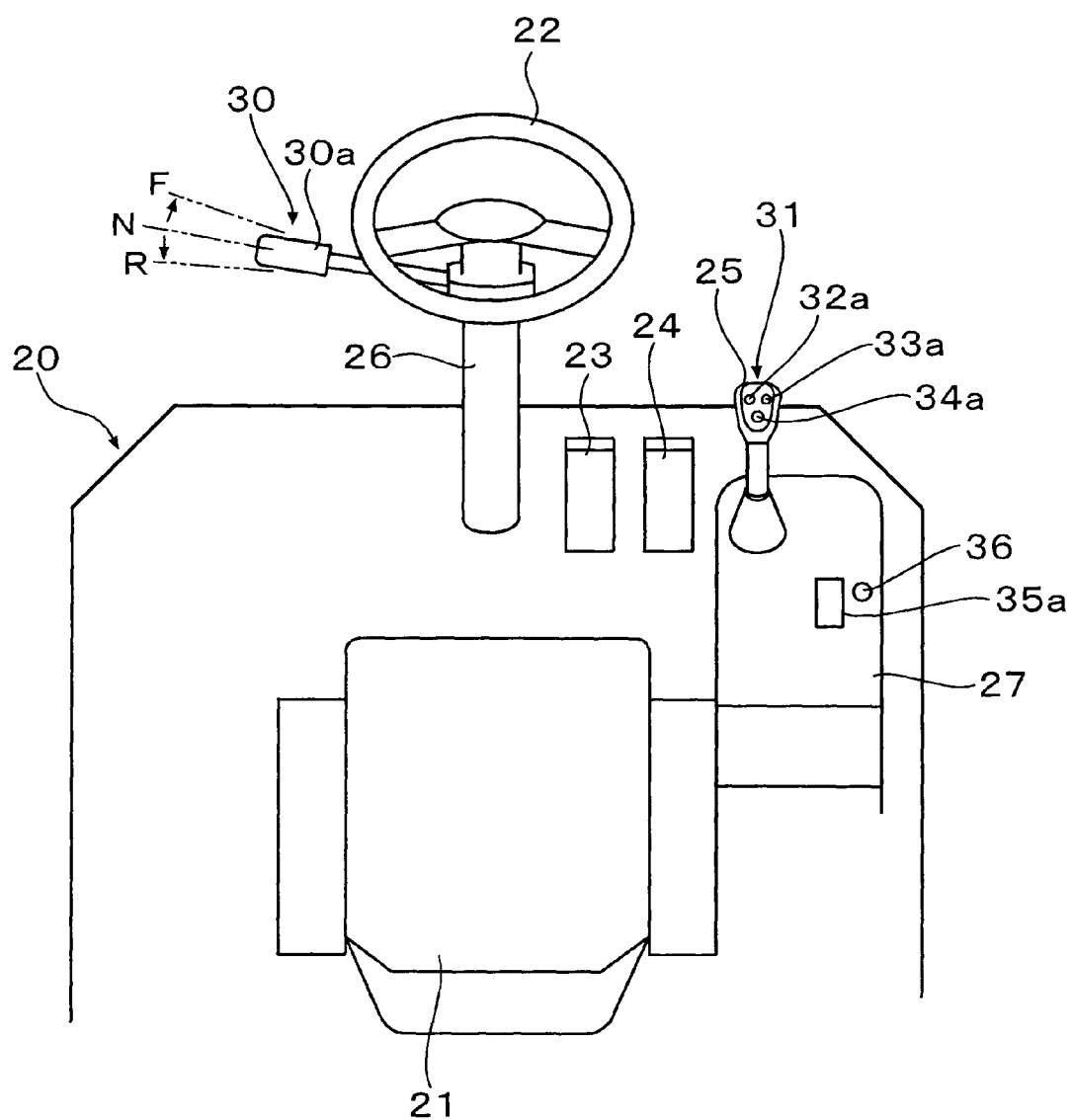
FIG. 2 is a view illustrating the outline of an interior of an operator's cab of the work machine with the first embodiment mounted thereon.
Figure 3:
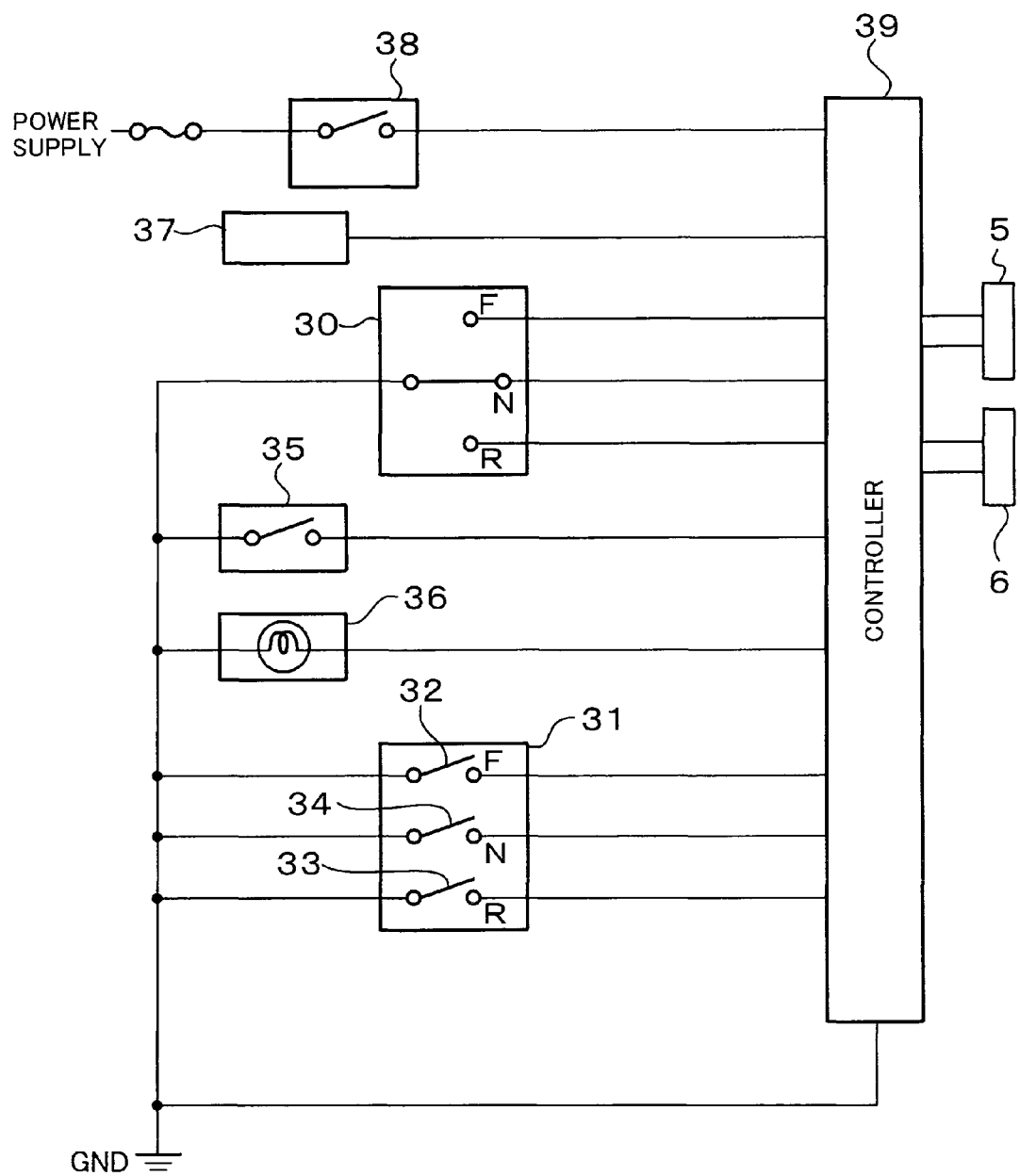
FIG. 3 is an electric circuit diagram depicting the construction of the first embodiment.
Figure 4:
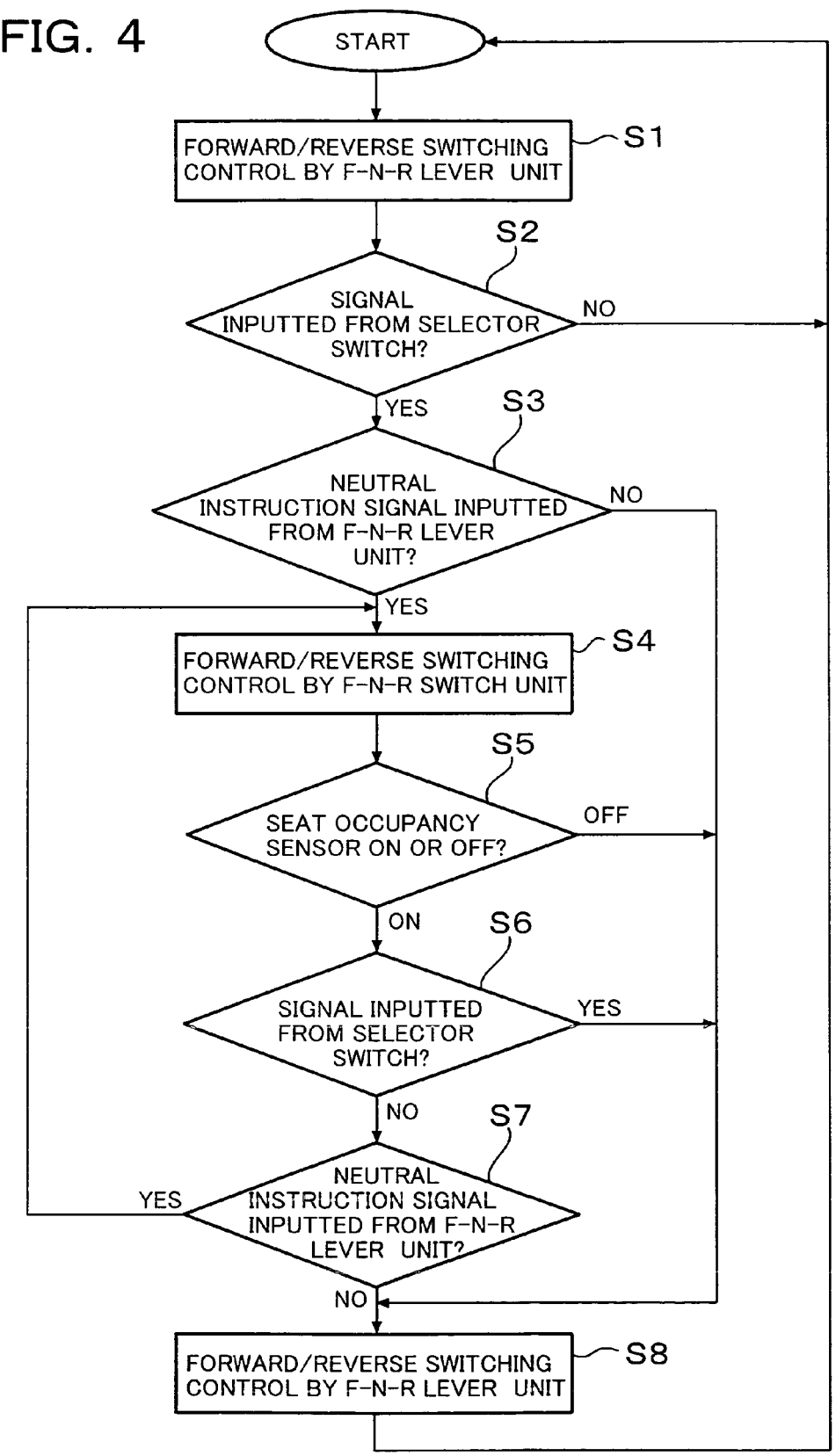
FIG. 4 is a flow chart illustrating a control procedure by the first embodiment.

A first embodiment will be described with reference to FIGS. 1 through 4. FIG. 1 is a diagram showing the outline of an undercarriage of a work machine to be controlled by a first embodiment of the present invention, FIG. 2 is a view illustrating the outline of an interior of an operator's cab of the work machine with the first embodiment mounted thereon, FIG. 3 is an electric circuit diagram depicting the construction of the first embodiment, and FIG. 4 is a flow chart illustrating a control procedure by the first embodiment.

The first embodiment is to be mounted on a work machine which travels by wheels, such as a wheeled excavator or wheel loader.

As shown in FIG. 1, the undercarriage 1 of the work machine is provided with an engine 2, a driving shaft 13 powered by the engine 2, a driven shaft 14 for transmitting power to an axle 15 for wheels 16, 17, a power transmission means 8 for performing transmission of power between the driving shaft 13 and the driven shaft 14, and a hydraulic circuit 3 for controlling pressure oil to be fed to the power transmission means 8.

The power transmission means 8 is provided with a first gear mechanism 11 arranged on the driving shaft 13, a second gear mechanism 12 arranged on the driven shaft 14, and a forward clutch 9 and reverse clutch 10 for selectively permitting transmission of power between the first gear mechanism 11 and the second gear mechanism 12.

The first gear mechanism 11 has a large gear 11a rotatable together with the driving shaft 13 and small gears 11b, 11c arranged in meshing engagement with the large gear 11a. The second gear mechanism 12 has a large gear 12a rotatable together with the driven shaft 14 and small gears 12b, 12c arranged in meshing engagement with the large gear 12a.

The forward clutch 9 is arranged between the small gear 11b in the first gear mechanism 11 and the small gear 12b in the second gear mechanism 12, and has a movable clutch member 9a rotatable together with the small gear 11b, a stationary clutch member 9b rotatable together with the small gear 12b, and an oil chamber 9c into which pressure oil flows to move the movable clutch 9a toward the stationary clutch member 9b. In other words, the forward clutch 9 is constructed such that by pressure oil flowed into the oil chamber 9c, the movable clutch 9a is moved toward the stationary clutch 9b to come into engagement with the stationary clutch 9b.

The reverse clutch 10 is arranged between the small gear 11c in the first gear mechanism 11 and the small gear 12c in the second gear mechanism 12, and has a movable clutch member 10a rotatable together with the small gear 11c, a stationary clutch member 10b rotatable together with the small gear 12c, and an oil chamber 10c into which pressure oil flows to move the movable clutch 10a toward the stationary clutch member 10b. In other words, the reverse clutch 10 is constructed such that by pressure oil flowed into the oil chamber 10c, the movable clutch 10a is moved toward the stationary clutch 10b to come into engagement with the stationary clutch 10b.

The hydraulic circuit 3 is provided with a hydraulic pump 4 driven by the engine 2, a forward solenoid valve 5 arranged between the hydraulic pump 4 and the forward clutch 9 and operable by electric power, a reverse solenoid valve 6 arranged between the hydraulic pump 4 and the reverse clutch 10 and operable by electric power, and a working oil reservoir 7 for storing working oil.

The forward solenoid valve 5 can be switched to a first position 5a at which the oil chamber 9c of the forward clutch 9 is brought into communication with the working oil reservoir 7, or to a second position 5b at which oil delivered from the hydraulic pump 4 is guided to the oil chamber 9c of the forward clutch 9. This forward solenoid valve 5 is switched to the second position 5b upon feeding of electric power to a pilot terminal 5c, and is self-reset to the first position 5a upon cut-off of electric power.

The reverse solenoid valve 6 can be switched to a first position 6a at which the oil chamber 10c of the reverse clutch 10 is brought into communication with the working oil reservoir 7, or to a second position 6b at which oil delivered from the hydraulic pump 4 is guided to the oil chamber 10c of the forward clutch 10. This forward solenoid valve 6 is switched to the second position 6b upon feeding of electric power to a pilot terminal 6c, and is self-reset to the first position 6a upon cutting-off of electric power.

As illustrated in FIG. 2, disposed inside an operator's cab 20 of the work machine are an operator's seat 21 which an operator occupies, a steering wheel 22 for steering the work machine, an accelerator pedal 24, a brake pedal 23, and a front attachment control lever 25 for controlling a front attachment. The operator's seat 21 is disposed approximately centrally in the operator's cabin 20. The steering wheel 22 is disposed in a front of the operator's seat 21. The accelerator pedal 23 and the brake pedal 24 are disposed side by side by the side of a basal end portion of a steering column 26 which supports the steering wheel 22. The front attachment control lever 25 is disposed on a front end part of a top wall of a console 27 disposed by the side of the operator's seat 21.

The first embodiment is provided with a F-N-R lever unit 30 (the first forward/reverse control means). The F-N-R lever unit has a F-N-R lever 30a, which sticks out sideward from the steering column 26 below the steering wheel 22 and is manually operated to effect shifting. In accordance with an operation of the F-N-R lever 30a, the F-N-R lever unit 30 outputs a forward instruction signal that instructs forward, a reverse instruction signal that instructs reverse, or a neutral instruction signal that instructs neutral. The F-N-R lever 30a is constructed such that it can be shifted to a forward position F that instructs forward, a reverse position R that instructs reverse or a neutral position N that instructs neutral and it can be held at the forward position F, the reverse position R or the neutral position N.

The F-N-R lever 30a and the front attachment control lever 25 are in a positional relation such that, when the F-N-R lever 30 sticks out toward the left side from the steering column 27, the front attachment control lever 25 is disposed in a right front of the operator's seat 21 or that, when the F-N-R lever 30a sticks out conversely to the right side from the steering column 26, the front attachment control lever 25 is disposed in a left front of the operator's seat 21. In other words, the F-N-R lever 30a and the front attachment control lever 22 are disposed such that the F-N-R lever 30a and the steering wheel 22 can be operated by the same one hand while the front attachment control lever 25 can be operated by the other one hand. In the first embodiment, the F-N-R lever 30a is disposed to stick out toward the left side from the steering column 26, and the front attachment control lever 25 is disposed in the right front of the operator's seat 21.

The first embodiment is also provided, in addition to the above-mentioned F-N-R lever unit 30, with a F-N-R switch unit 31 (the second forward/reverse control means) that instructs forward, reverse or neutral of the work machine. The F-N-R switch unit 31 is composed of a forward switch 32 for outputting a forward instruction signal that instructs forward, a reverse switch 33 for outputting a reverse instruction switch that instructs reverse, and a neutral switch 34 for outputting a neutral instruction signal that instructs neutral. These forward switch 32, reverse switch 33 and neutral switch 34 comprise pushbutton switches equipped with self-resetting pushbuttons, and are constructed such that, when the pushbuttons are pushed, they output instruction signals and the instruction signals are continuously outputted although the pushbuttons themselves are reset by themselves. A forward button 32a as the pushbutton of the forward switch 32, a reverse button 33a as the pushbutton of the reverse switch 33, and a neutral button 34a as the pushbutton of the neutral switch are disposed on a top portion of the front attachment control lever 25.

The first embodiment is also provided with a selector switch 35 (the switching instruction means and cancellation instructing means), which outputs an instruction signal that instructs a switch from the first control state, in which forward/reverse switching control is performed by the F-N-R lever unit 30, to the second control state, in which forward/reverse switching control is performed by the F-N-R switch unit 31, and which also outputs an instruction signal that instructs a cancel of the second control state. The selector switch 35 comprises a pushbutton switch equipped with a self-resetting pushbutton, and is constructed such that, when the pushbutton is pushed, it outputs an instruction signal and the instruction signal is continuously outputted although the pushbutton itself is reset by itself and, when the pushbutton is pressed again, the output of the instruction signal is stopped. A selector button 35a as the pushbutton of the selector switch 35 is disposed on the top wall of the console 27. It is to be noted that an information lamp 36, which informs that the control state is the second control state, is disposed by the side of the selector button 35a.

The first embodiment is further provided with a seat occupancy sensor 37 (the seat occupancy detection means), which as a use determination means for determining whether or not the F-N-R switch unit 31 is in use, detects whether or not the operation is in occupancy of the operator's seat 21, so that the F-N-R switch unit 31 is not determined to be in use when no occupancy of the operator's seat is detected by the seat occupancy sensor 31. The seat occupancy sensor 37 is constructed such that, when the operator occupies the operator's seat 21, it is turned on to outputs a seat occupancy detection signal indicative of the detection of seat occupancy and, when the operator leaves the operator's seat 21, it is turned off to stop the output of the seat occupancy detection signal.

As depicted in FIG. 3, the first embodiment is further provided with a controller 39 (the control means) for controlling the forward solenoid valve 5, reverse solenoid valve 6 and information lamp 36. This controller 39 is connected to the power supply via a key switch 38, and is also connected to the seat occupancy sensor 37, F-N-R lever unit 30, selector switch 35, information lamp 36 and F-N-R switch unit 31.

This controller 39 operates responsive to an instruction signal from the F-N-R lever unit 30, an instruction signal from the selector switch 31, an instruction signal form the selector switch 35 or a seat occupancy detection signal from the seat occupancy sensor 37, and is set as will be described next under (1) to (6).

(1) The controller 39 is set to establish the first control state upon starting.

(2) The controller 39 is set such that the first control state is switched to the second control state when a neutral instruction signal has already been inputted from the F-N-R lever unit 30 upon input of an instruction signal from the selector switch 35 in the first control state.

(3) The controller 39 is set to turn on the information lamp 36 when the control state is the second control state.

(4) The controller 39 is set such that the second control state is cancelled to return to the first control state when a forward instruction signal or reverse instruction signal is inputted from the F-N-R lever unit 30 in the second control state.

(5) The controller 39 is set to cancel the second control state and to return to the first control state when an instruction signal is inputted from the selector switch 35 in the second control state.

(6) The controller 39 is set to cancel the second control state and to return to the first control state when a seat occupancy detection signal is inputted from the seat occupancy sensor 37 in the second control state.

The first embodiment constructed as described above operates as illustrated in FIG. 4.

[Starting of the Controller]

When the key switch 38 is turned on, electric power is fed from the power supply to the controller 39 via the key switch 38 to start the controller 39. At this time, the controller 39 is in the first control state in which forward/reverse switching control is performed by the F-N-R lever unit 30 (step S1).

[Forward/Reverse Switching Control by the F-N-R Lever Unit]

When in the first control state, the F-N-R lever 30a is shifted to the forward position F and a forward instruction signal is inputted from the F-N-R lever unit 30 to the controller 39, electric power is fed from the controller 39 to the pilot terminal 5c of the forward solenoid valve 5 so that the forward solenoid valve 5 is switched from the first position 5a to the second position 5b. Oil delivered from the hydraulic pump 4 is then fed to the oil chamber 9c of the forward clutch 9 to move the movable clutch member 9a, so that the movable clutch member 9a comes into engagement with the stationary clutch member 9b. As a consequence, the power transmission means is brought into the state that power can be transmitted from the small gear 11b in the first gear mechanism 11 to the small gear 12b in the second gear mechanism 12, in other words, the state that power which moves the work machine forward can be transmitted to the axle 15.

When in the first control state, the F-N-R lever 30a is shifted to the reverse position R and a reverse instruction signal is inputted from the F-N-R lever unit 30 to the controller 39, electric power is fed from the controller 39 to the pilot terminal 6c of the reverse solenoid valve 6 so that the reverse solenoid valve 6 is switched from the first position 6a to the second position 6b. Oil delivered from the hydraulic pump 4 is then fed to the oil chamber 10c of the reverse clutch 10 to move the movable clutch member 10a, so that the movable clutch member 10a comes into engagement with the stationary clutch member 10b. As a consequence, the power transmission means is brought into the state that power can be transmitted from the small gear 11c in the first gear mechanism 11 to the small gear 12c in the second gear mechanism 12, in other words, the state that power which moves the work machine in reverse can be transmitted to the axle 15.

When in the first control state, the F-N-R lever 30a is shifted from the forward position F to the neutral position N and a neutral instruction signal is inputted from the F-N-R lever unit 30 to the controller 39, the feeding of electric power from the controller 39 to the forward solenoid valve 5 is stopped so that the forward solenoid valve 5 is allowed to return from the second position 5b to the first position 5a by a return spring 5d. The pressure oil which has been fed to the oil chamber 9c of the forward clutch 9 is then drained to the working oil reservoir 7 so that the movable clutch member 9a is brought out of engagement from the stationary clutch member 9b. As a consequence, the power transmission means is brought into the state that no power can be transmitted from the small gear 11b in the first gear mechanism 11 to the small gear 12b in the second gear mechanism 12, in other words, the state that power which moves the work machine forward cannot be transmitted to the axle 15.

When in the first control state, the F-N-R lever 30a is shifted from the reverse position R to the neutral position N and a neutral instruction signal is inputted from the F-N-R lever unit 30 to the controller 39, the feeding of electric power from the controller 39 to the reverse solenoid valve 6 is stopped so that the reverse solenoid valve 6 is allowed to return from the second position 6b to the first position 6a by a return spring 6d. The pressure oil which has been fed to the oil chamber 10c of the forward clutch 10 is then drained to the working oil reservoir 7 so that the movable clutch member 10a is brought out of engagement from the stationary clutch member 10b. As a consequence, the power transmission means is brought into the state that no power can be transmitted from the small gear 11c in the first gear mechanism 11 to the small gear 12c in the second gear mechanism 12, in other words, the state that power which moves the work machine forward cannot be transmitted to the axle 15.

[Maintenance of the First Control State]

When the selector button 35a is not pressed in the first control state, an instruction signal, specifically an instruction signal that instructs a switch from the first control state to the second control state is not inputted from the selector switch 35 to the controller 39 ("NO" in step S2). Accordingly, the first control state is maintained by the controller 39.

When the selector button 35a is pressed in the first control state, on the other hand, an instruction signal outputted from the selector switch 35 is inputted to the controller 39 as an instruction signal that instructs a switch from the first control state to the second control state ("YES" in step S2). When a forward instruction signal or reverse instruction signal has already been inputted, in other word, no neutral instruction signal has been inputted from the F-N-R lever unit 30 to the controller 39 at this time ("NO" in step S3), the switching instruction by the selector switch 35 is cancelled by the controller 39 so that the first control state is maintained (step S8).

In other words, when the F-N-R lever 30a of the F-N-R lever unit 30 is held at the forward position F or reverse position R, the power transmission means is not brought into the state that forward/reverse switching of the work machine can be performed by the F-N-R switch unit 31 (the second control state) but priority is given to the state that forward/reverse switching of the work machine can be performed by the F-N-R lever unit 30 (the first control state).

[A Switch from the First Control State to the Second Control State]

When in the first control state, a neutral instruction signal has already been inputted from the F-N-R lever unit 30 to the controller 39 ("YES" in step S3) at the time that an instruction signal outputted from the selector switch 35 is inputted to the controller 39 as an instruction signal that instructs a switch from the first control state to the second control state ("YES" in step S2), the first control state is switched to the second control state by the controller 39 (step S4).

[Forward/Reverse Switching Control by the F-N-R Switch Unit]

When in the second control state, the forward button 32a is pressed and a forward instruction signal is inputted from the forward switch 32 to the controller 39, electric power is fed from the controller 39 to the pilot terminal 5c of the forward solenoid valve 5 so that the forward solenoid valve 5 is switched to the second position 5b. The movable clutch member 9a of the forward clutch 9 is then brought into engagement with the stationary clutch member 9b to bring the power transmission means into the state that power, which moves the work machine forward, is transmitted to the axle 15.

When in the second control state, the reverse button 33a is pressed and a reverse instruction signal is inputted from the reverse switch 33 to the controller 39, electric power is fed from the controller 39 to the pilot terminal 6a of the reverse solenoid valve 6 so that the reverse solenoid valve 6 is switched to the second position 6b. The movable clutch member 10a of the reverse clutch 10 is then brought into engagement with the stationary clutch member 10b to bring the power transmission means into the state that power, which moves the work machine in reverse, is transmitted to the axle 15.

When in the second control state, subsequent to an input of a forward instruction signal from the forward switch 32 to the controller 39, the neutral button 34a is pressed and a neutral instruction signal is inputted from the neutral switch 34 to the controller 39, the feeding of electric power from the controller 39 to the forward solenoid valve 5 is stopped so that the forward solenoid valve 5 returns to the first position 5a. The movable clutch member 9a of the forward clutch 9 is then brought out of engagement from the stationary clutch member 9b to bring the power transmission means into the state that power, which moves the work machine forward, cannot be transmitted to the axle 15.

When in the second control state, subsequent to an input of a reverse instruction signal from the reverse switch 33 to the controller 39, the neutral button 34a is pressed and a neutral instruction signal is inputted from the neutral switch 34 to the controller 39, the feeding of electric power from the controller 39 to the reverse solenoid valve 6 is stopped so that the reverse solenoid valve 6 returns to the first position 6a. The movable clutch member 10a of the reverse clutch 10 is then brought out of engagement from the stationary clutch member 10b to bring the power transmission means into the state that power, which moves the work machine in reverse, cannot be transmitted to the axle 15.

[Maintenance of the Second Control State]

The seat occupancy sensor 37 remains "ON" while the operator is in occupancy of the operator's seat 21, and during this time, a seat occupancy detection signal is continuously inputted from the seat occupancy sensor 37 to the controller 39. When in the second control state, a seat occupancy detection signal has already been inputted from the seat occupancy sensor 37 to the controller 39 ("ON" in step S5), an instruction signal that cancels the second control state is not inputted from the selector switch 35 to the controller 39 ("NO" in step S6) and a neutral instruction signal is inputted from the F-N-R lever unit 30 to the controller 39 ("YES" in step S7), the second control state is maintained by the controller 39.

[A Return from the Second Control State to the First Control State]

When the operator leaves the operator's seat 21, the seat occupancy sensor 37 is turned off, and as a result, the input of a seat occupancy detection signal from the seat occupancy sensor 37 to the controller 39 is stopped. When the input of the seat occupancy detection signal from the seat occupancy sensor 37 to the controller 39 is stopped in the second control state ("OFF" in step S5), the second control state is cancelled by the controller 39 to return to the first control state (step S8).

In other words, when the operator leaves the operator's seat 21, the power transmission means returns to the state that forward/reverse switching of the work machine can be performed only by the F-N-R lever unit 30.

When in the second control state, the selector button 35a is pressed in the state that a seat occupancy detection signal has been inputted from the seat occupancy sensor 37 to the controller 39 ("ON" in step S5), an instruction signal outputted from the selector switch 35 is inputted to the controller 39 as an instruction signal that instructs a cancel of the second control state ("YES" in step S6). At this time, the second control state is cancelled by the controller 39 to return to the first control state (step S8).

In other words, when the selector button 35a is pressed in the state that forward/reverse switching of the work machine can be performed by the F-N-R switch unit 31, the power transmission means returns to the state that forward/reverse switching of the work machine can be performed only by the F-N-R lever unit 30.

When in the second control state, a seat occupancy detection signal has already been inputted from the seat occupancy sensor 37 to the controller 39 ("ON" in step S5), an instruction signal is not inputted from the selector switch 35 to the controller 39 ("NO" in step S6) and a forward instruction signal or reverse instruction signal is inputted from the F-N-R lever unit 30 to the controller 39, in other words, when no neutral instruction signal is inputted to the controller 39 ("NO" in step S7), the second control state is cancelled by the controller 39 to return to the first control state (step S8).

In other words, when the F-N-R lever 30a is shifted to the forward position F or reverse position R in the state that forward/reverse switching of the work machine can be performed by the F-N-R switch unit 31, the power transmission means returns to the state that forward/reverse switching of the work machine can be performed only by the F-N-R lever unit 30.

According to the first embodiment, the following advantageous effects can be brought about.

In the first embodiment, the second control state can be cancelled by a pressing operation of the selector button 35a of the selector switch 35 without relying upon an operation of the F-N-R lever unit 30. As a result, the operator can be induced to cancel the second control state. Upon performing work, which does not require any travel, in the state that the control state has been switched to the second control state, the second control state can be cancelled without involving an act that would initiate a travel (a F-N-R lever shifting operation), thereby making it possible to avoid any careless travel not intended by the operator.

In the first embodiment, the control state automatically returns to the first control state if the operator leaves the operator's seat 21 with the second control state being left over. Even if the former operator leaves the second control state uncanceled upon operator shifting, for example, it is therefore possible to have the control state returned beforehand to the first control state before the shifted operator rides on the work machine. Accordingly, any travel not intended by the operator can be avoided even if the shifted operator carelessly operates the forward button 32a or the forward button 33a.

Second Embodiment

Figure 5:
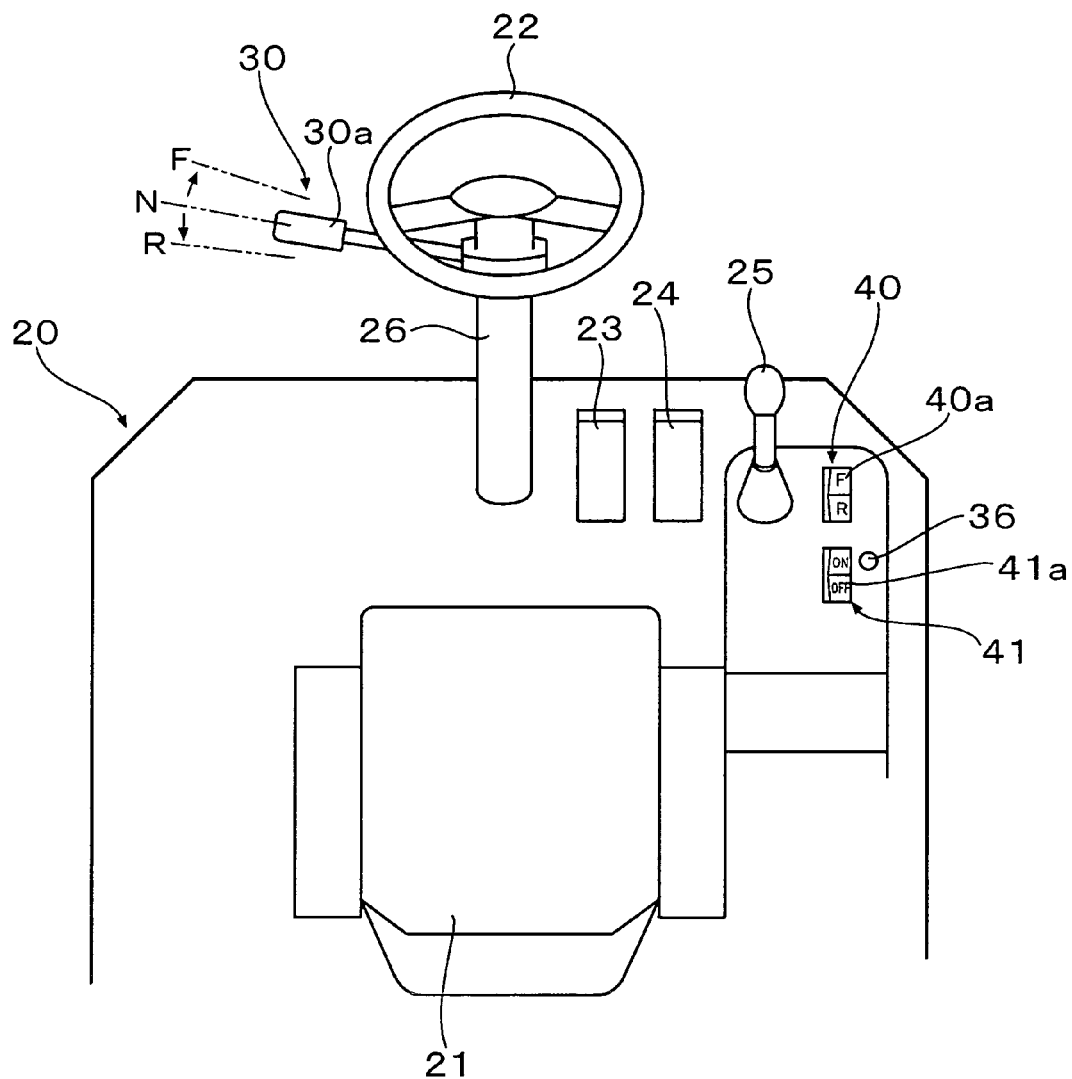
FIG. 5 is a view illustrating the outline of the interior of the operator's cab of the work machine with a second embodiment of the present invention mounted thereon.
Figure 6:
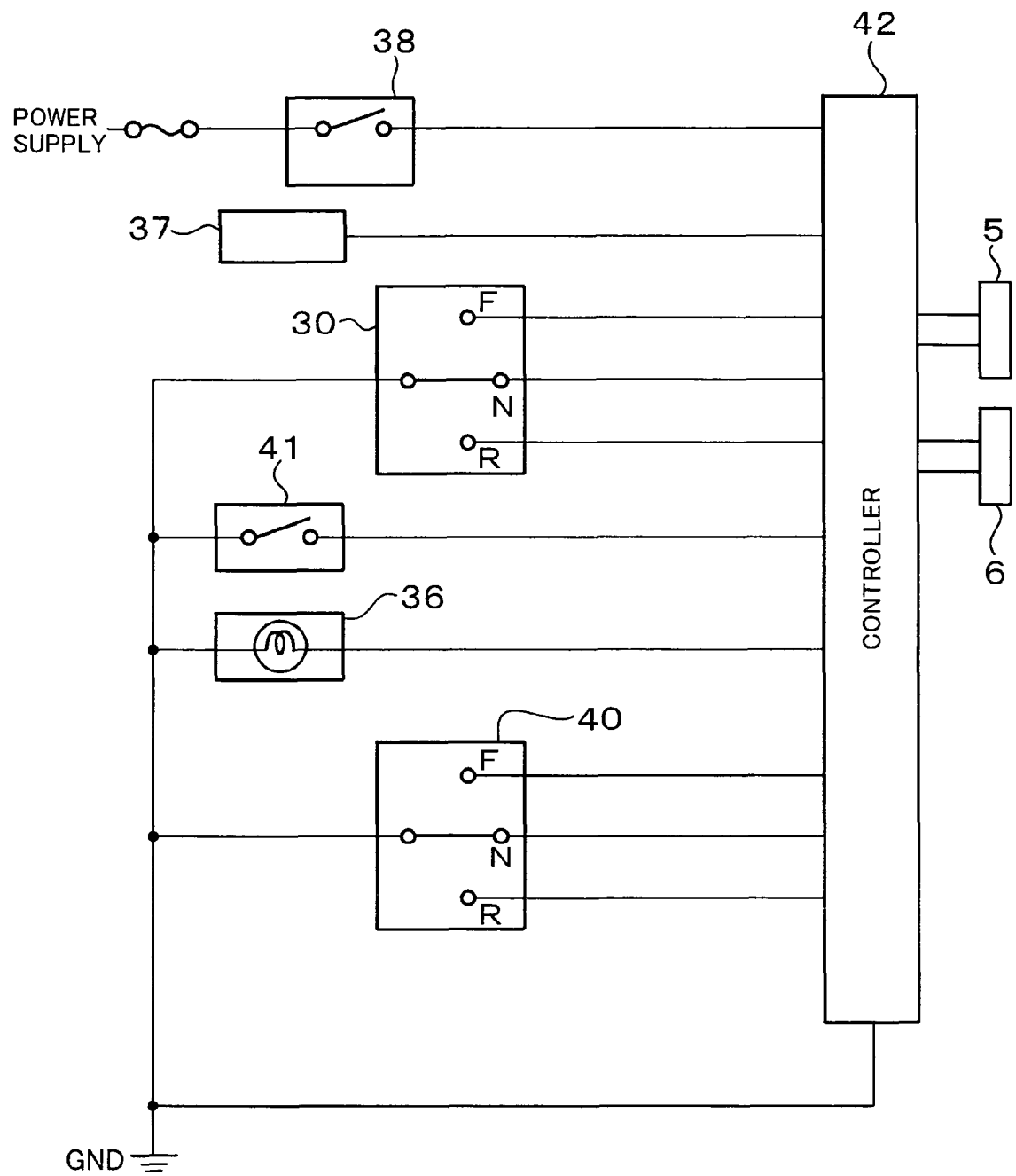
FIG. 6 is an electric circuit diagram depicting the construction of the second embodiment.
Figure 7:
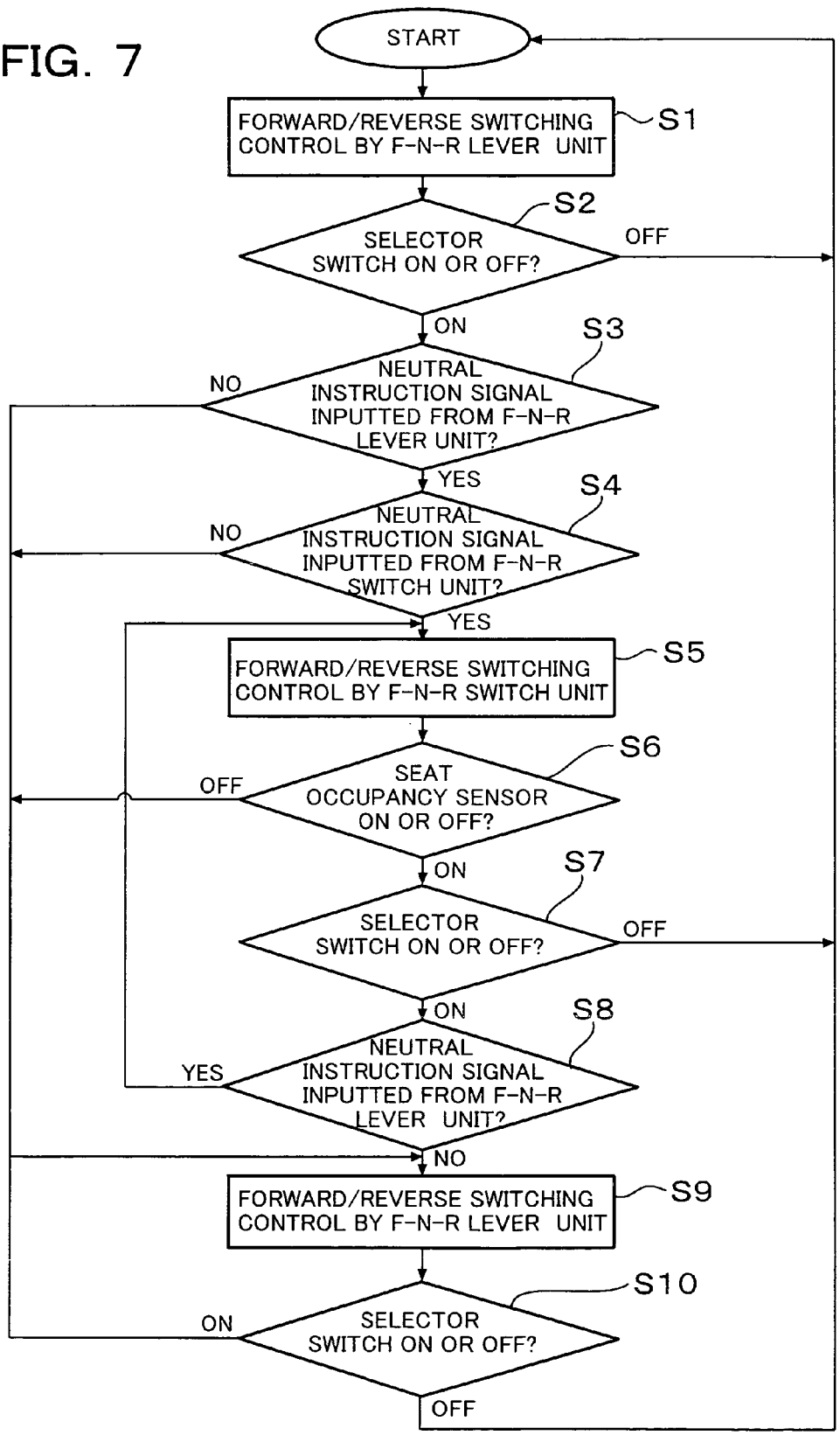
FIG. 7 is a flow chart illustrating a control procedure by the second embodiment.

A second embodiment will be described with reference to FIGS. 5 through 7. FIG. 5 is a view illustrating the outline of the interior of the operator's cab of the work machine with a second embodiment of the present invention mounted thereon, FIG. 6 is an electric circuit diagram depicting the construction of the first embodiment, and FIG. 7 is a flow chart illustrating a control procedure by the second embodiment. It is to be noted that among the elements of structure shown in FIGS. 5 and 6, those equivalent to the corresponding ones sown in FIGS. 2 and 3 are identified by the same symbols as those added to FIGS. 2 and 3.

Similar to the first embodiment, the second embodiment is also to be mounted on a work machine which travels by wheels, such as a wheeled excavator or wheel loader, and is a forward/reverse control system for a work machine, which can be adapted to perform forward/reverse switching of the undercarriage 1 of the work machine as illustrated in FIG. 1 described above.

As shown in FIGS. 5 and 6, the second embodiment is provided with a F-N-R switch unit 40 (the second forward/ reverse control means) different from the F-N-R switch unit 31 in the first embodiment. Described specifically, the F-N-R switch unit 40 comprises a rocker switch although the F-N-R switch unit 31 is composed of three pushbutton switches.

This F-N-R switch unit 40 has a F-N-R control member 40a, which can be switched to a forward position at which a forward instruction signal is outputted to instruct forward, a reverse position at which a reverse instruction signal is outputted to instruct reverse or a neutral position at which a neutral instruction signal is outputted to instruct neutral, and which can also be held at the forward position, reverse position or neutral position. This F-N-R control member 40a is disposed on the top wall of the console 27 in the vicinity of the front attachment control lever 25 which controls the front attachment.

Different from the selector switch 35 in the first embodiment, the second embodiment is provided with a selector switch 41 composed of a rocker switch.

This selector switch 41 has a switching control member 41a, which can be held at an "ON" position (the switching state) at which a switching instruction signal is outputted to instruct a switch from the first control state to the second control state or at an "OFF" position (cancellation position) at which the output of a switching instruction signal is stopped, in other words, a cancel of the second control state is instructed. This switching control member 41a is disposed on the top wall of the console 27 in the vicinity of the front attachment control lever 25. It is to be noted that the information lamp 36, which informs that the control state is the second control state, is disposed by the side of the switching control member 41a of the selector switch 41.

Similar to the first embodiment, the second embodiment is also provided with a seat occupancy sensor (the seat occupancy detection means), and the F-N-R switch unit 40 is not determined to be in use when no occupancy of the operator's seat is detected by the seat occupancy sensor 37.

As the second embodiment is provided with the F-N-R switch unit 40 and selector switch 41 different from the corresponding ones in the first embodiment as mentioned above, the second embodiment is provided with a controller 42 of different setting from the controller 39 in the first embodiment. This controller 42 is set as will be described next under (1) to (7).

(1) Similar to the controller 39, the controller 42 is set to establish the first control state upon starting.

(2) Different from the controller 39, the controller 42 is set such that the first control state is switched to the second control state when a neutral instruction signal has already been inputted from both of the F-N-R lever unit 30 and the F-N-R switch unit 40 upon input of a switching instruction signal from the selector switch 41 in the first control state.

(3) Similar to the controller 39, the controller 42 is set to turn on the information lamp 36 when the control state is the second control state.

(4) Similar to the controller 39, the controller 42 is set such that the second control state is cancelled to return to the first control state when a forward instruction signal or reverse instruction signal is inputted from the F-N-R lever unit 30 in the second control state.

(5) Different from the controller 39, the controller 39 is set to cancel the second control state and to return to the first control state when the input of a switching instruction signal from the selector switch 41 is stopped in the second control state.

(6) Similar to the controller 39, the controller 39 is set to cancel the second control state and to return to the first control state when the input of a seat occupancy detection signal from the seat occupancy sensor 37 is stopped in the second control state.

(7) The controller 42 is set such that, after the control state is switched to the first control state with the selector switch 41 having been turned on, any instruction by the selector switch 41 is cancelled until the selector switch 41 is turned off.

The second embodiment constructed as described above operates as illustrated in FIG. 7.

[Starting of the Controller]

When the key switch 38 is turned on, electric power is fed from the power supply to the controller 42 via the key switch 38, and as a result, the controller 39 is started. At this time, the controller 42 is in the state that forward/reverse switching of the work machine can be performed by the F-N-R lever unit 30 (step S1).

[Forward/Reverse Switching Control by the F-N-R Lever Unit]

When in the first control state, the F-N-R lever 30a is shifted to the forward position F and a forward instruction signal is inputted from the F-N-R lever unit 30 to the controller 42, electric power is fed from the controller 42 to the pilot terminal 5c of the forward solenoid valve 5 so that the forward solenoid valve 5 is switched to the second position 5b. Oil delivered from the hydraulic pump 4 is then fed to the oil chamber 9c of the forward clutch 9 to move the movable clutch member 9a, so that the movable clutch member 9a comes into engagement with the stationary clutch member 9b. As a consequence, the power transmission means is brought into the state that power, which moves the work machine forward, can be transmitted to the axle 15.

When in the first control state, the F-N-R lever 30a is shifted to the reverse position R and a reverse instruction signal is inputted from the F-N-R lever unit 30 to the controller 42, electric power is fed from the controller 42 to the pilot terminal 6c of the reverse solenoid valve 6 so that the reverse solenoid valve 6 is switched to the second position 6b. Oil delivered from the hydraulic pump 4 is then fed to the oil chamber 10c of the reverse clutch 10 to move the movable clutch member 10a, so that the movable clutch member 10a comes into engagement with the stationary clutch member 10b. As a consequence, the power transmission means is brought into the state that power, which moves the work machine in reverse, can be transmitted to the axle 15.

When in the first control state, the F-N-R lever 30a is shifted from the forward position F to the neutral position N and a neutral instruction signal is inputted from the F-N-R lever unit 30 to the controller 42, the feeding of electric power from the controller 42 to the forward solenoid valve 5 is stopped so that the forward solenoid valve 5 is allowed to return to the first position 5a by the return spring 5d. The pressure oil which has been fed to the oil chamber 9c of the forward clutch 9 is then drained to the working oil reservoir 7 so that the movable clutch member 9a is brought out of engagement from the stationary clutch member 9b. As a consequence, the power transmission means is brought into the state that power, which moves the work machine forward, cannot be transmitted to the axle 15.

When in the first control state, the F-N-R lever 30a is shifted from the reverse position R to the neutral position N and a neutral instruction signal is inputted from the F-N-R lever unit 30 to the controller 42, the feeding of electric power from the controller 42 to the reverse solenoid valve 6 is stopped so that the reverse solenoid valve 6 is allowed to return to the first position 6a by the return spring 6d. The pressure oil which has been fed to the oil chamber 10c of the reverse clutch 10 is then drained to the working oil reservoir 7 so that the movable clutch member 10a is brought out of engagement from the stationary clutch member 10b. As a consequence, the power transmission means is brought into the state that power, which moves the work machine in reverse, cannot be transmitted to the axle 15.

[Maintenance of the First Control State]

When the selector switch 41 is not turned on in the first control state ("OFF" in step S2), no instruction signal is inputted from the selector switch 41 to the controller 42. Accordingly, the first control state is maintained by the controller 42.

When the selector switch 41 is turned on in the first control state, on the other hand, a switching instruction signal is inputted from the selector switch 41 to the controller 42 ("ON" in step S2). When a forward instruction signal or reverse instruction signal has already been inputted, in other word, no neutral instruction signal has been inputted from the F-N-R lever unit 30 to the controller 42 ("NO" in step S3), the switching instruction by the selector switch 41 is cancelled by the controller 42 so that the first control state is maintained (step S9).

In other words, when the F-N-R lever 30a is held at the forward position or reverse position in the first control state, even a switch of the switching control member 41a of the selector switch 41 to the "ON" position does not bring the power transmission means into the state that forward/reverse switching of the work machine can be performed by the F-N-R switch unit 40 (the second control state), but maintains it in the state that forward/reverse switching of the work machine can be performed only by the F-N-R lever unit 30 (the first control state). In other words, priority is given to an operation of the F-N-R lever unit 30.

When the selector switch 41 is turned on in the first control state as mentioned above, a switching instruction signal is inputted from the selector switch 41 to the controller 42 ("ON" in step 2). Even when a neutral instruction signal has already been inputted from the F-N-R lever unit 30 to the controller 42 at this time ("YES" in step S3), a switching instruction by the selector switch 41 is cancelled by the controller 42 to maintain the first control state (step S9) provided that a forward instruction signal or reverse instruction signal has already been inputted from the F-N-R switch unit 40 to the controller 42, in other words, no neutral instruction signals has already been inputted from the F-N-R switch unit 40 to the controller 42 ("NO" in step S4).

In other words, when the F-N-R control member 40a of the F-N-R switch unit 40 is held at the forward position or reverse position, even a switch of the switching control member 41a of the selector switch 41 to the "ON" position does not bring the power transmission means into the state that forward/reverse switching of the work machine can be performed by the F-N-R switch unit 40, but maintains it in the state that forward/reverse switching of the work machine can be performed only by the F-N-R lever unit 30 with the switching control member 41a of the selector switch 41 being maintained in the "ON" position.

[A Switch from the First Control State to the Second Control State]

When the selector switch 41 is turned on in the first control state as mentioned above, a switching instruction signal that instructs a switch from the first control state to second control state is inputted to the controller 42 ("ON" in step S2). When a neutral instruction signal has already been inputted from the F-N-R lever unit 30 to the controller 42 at this time ("YES" in step S3) and a neutral instruction signal has also been already inputted from the F-N-R switch unit 40 at this time, a switch from the first control state to the second control state is performed by the controller 42 (step S5).

In other words, when the upon a switch of the switching control member 41a of the selector switch 41 to the "ON" position, the F-N-R lever 30a of the F-N-R lever unit 30 has already been held at the neutral position N and the F-N-R control member 40a of the F-N-R switch unit 40 has already been held at the neutral position, the power transmission means is brought into the state that switching control of the work machine can be performed by the F-N-R switch unit 40.

[Forward/Reverse Switching Control by the F-N-R Switch Unit]

When in the second control state, the F-N-R control member 40a of the F-N-R switch unit 40 is switched to the forward position and a forward instruction signal is inputted from the F-N-R switch unit 40 to the controller 42, electric power is fed from the controller 42 to the pilot terminal 5c of the forward solenoid valve 5 so that the forward solenoid valve 5 is switched to the second position 5b. The movable clutch member 9a of the forward clutch 9 is then brought into engagement with the stationary clutch member 9b to bring the power transmission means into the state that power, which moves the work machine forward, is transmitted to the axle 15.

When in the second control state, the F-N-R control member 40a of the F-N-R switch unit 40 is switched to the reverse position and a reverse instruction signal is inputted from the F-N-R switch unit 40 to the controller 42, electric power is fed from the controller 42 to the pilot terminal 6c of the reverse solenoid valve 6 so that the reverse solenoid valve 6 is switched to the second position 6b. The movable clutch member 10a of the reverse clutch 10 is then brought into engagement with the stationary clutch member 10b to bring the power transmission means into the state that power, which moves the work machine in reverse, is transmitted to the axle 15.

When in the second control state, the F-N-R control member 40a of the F-N-R switch unit 40 is switched from the forward position to the neutral position and a neutral instruction signal is inputted from the F-N-R switch unit 40 to the controller 42, the feeding of electric power from the controller 42 to the forward solenoid valve 5 is stopped so that the forward solenoid valve 5 returns to the first position 5a. The movable clutch member 9a of the forward clutch 9 is then brought out of engagement from the stationary clutch member 9b to bring the power transmission means into the state that power, which moves the work machine forward, cannot be transmitted to the axle 15.

When in the second control state, the F-N-R control member 40a of the F-N-R switch unit 40 is switched from the reverse position to the neutral position and a neutral instruction signal is inputted from the F-N-R switch unit 40 to the controller 42, the feeding of electric power from the controller 42 to the reverse solenoid valve 6 is stopped so that the reverse solenoid valve 6 returns to the first position 6a. The movable clutch member 01a of the reverse clutch 10 is then brought out of engagement from the stationary clutch member 10b to bring the power transmission means into the state that power, which moves the work machine in reverse, cannot be transmitted to the axle 15.

[Maintenance of the Second Control State]

The seat occupancy sensor 37 remains "ON" while the operator is in occupancy of the operator's seat 21, and during this time, a seat occupancy detection signal is continuously inputted from the seat occupancy sensor 37 to the controller 42. When in the second control state, a seat occupancy detection signal has already been inputted from the seat occupancy sensor 37 to the controller 42 ("ON" in step S6), the selector switch 41 is not turned off ("ON" in step S7) and a neutral instruction signal is inputted from the F-N-R lever unit 30 to the controller 42 ("YES" in step S7), the second control state is maintained by the controller 42.

[A Return from the Second Control State to the First Control State]

When the operator leaves the operator's seat 21, the seat occupancy sensor 37 is turned off, and as a result, the input of a seat occupancy detection signal from the seat occupancy sensor 37 to the controller 42 is stopped. When the input of the seat occupancy detection signal from the seat occupancy sensor 37 to the controller 42 is stopped in the second control state ("OFF" in step S6), the second control state is cancelled by the controller 42 to return to the first control state (step S9).

In other words, when the operator leaves the operator's seat 21, the power transmission means is, even when the switching control member 41a of the selector switch 41 is held at the "ON" position, brought out of the state that forward/reverse switching of the work machine can be performed by the F-N-R switch unit 30. The power transmission means returns to the state that forward/reverse switching of the work machine can be performed only by the F-N-R lever unit 30.

When in the second control state, the selector switch 41 is turned off ("OFF" in step S7) in the state that a seat occupancy detection signal has been inputted from the seat occupancy sensor 37 to the controller 42 ("ON" in step S6), the second control state is cancelled by the controller 42 to return to the first control state (step S1).

In other words, when the switching control member 41a of the selector switch 41 is switched to the "OFF" position in the state that forward/reverse switching of the work machine can be performed by the F-N-R switch unit 40, the power transmission means returns to the state that forward/reverse switching of the work machine can be performed only by the F-N-R lever unit 30.

When in the second control state, a seat occupancy detection signal has already been inputted from the seat occupancy sensor 37 to the controller 42 ("ON" in step S6), a selector switch 41 is not turned off ("ON" in step S7) and a neutral signal becomes no longer inputted from the F-N-R lever unit 30 to the controller 42 ("NO" in step S8), the second control state is cancelled by the controller 42 to return to the first control state (step S9).

In other words, when the F-N-R lever 30a of the F-N-R lever unit 30 is shifted to the forward position F or reverse position R in the state that forward/reverse switching of the work machine can be performed by the F-N-R switch unit 40, the power transmission means returns to the state that forward/reverse switching of the work machine can be performed only by the F-N-R lever unit 30 with the switching control member 41a of the selector switch 41 being held at the "ON" position.

[A Re-Operation of the Selector Switch]

When the power transmission means has returned to the first control sate with the selector switch 41 still maintained in the "ON" state ("NO" in step S3, "NO" in step S4 and "OFF" in step S6→step S9), the forward/reverse control system is in the state that a switching instruction signal has been inputted from the selector switch 41 to the controller 42. In this state, irrespective of whether or not a neutral instruction signal has been inputted from the F-N-R lever unit 30 to the controller 42, the switching instruction by the selector switch 41 is cancelled by the controller 42 and the first control state is maintained. It is, therefore, at the time of a turn-on of the selector switch 41 again after a turn-off of the selector switch 41 that the instruction of a switch by the selector switch 41 becomes effective ("OFF" in step S10→step S1→step S2).

In other words, after the power transmission means has been brought into the state that forward/reverse switching of the work machine can be performed by the F-N-R lever unit 30 with the switching control member 41a of the selector switch 41 being maintained at the "ON" position, the instruction of a switch by the selector switch 41 does not become effective until after the switching control member 41a of the selector switch 41 is switched again to the "ON" position subsequent to its switch to the "OFF" position.

According to the second embodiment, the following advantageous effects can be brought about.

In the second embodiment, the second control state can be cancelled by a pressing operation of the switching control member 41a of the selector switch 41 without relying upon an operation of the F-N-R lever unit 30. As a result, the operator can be induced to cancel the second control state. It is, therefore, possible to avoid any travel not intended by the operator which would otherwise take place by a careless operation of the F-N-R control member 40a.

In the second embodiment, the control state automatically returns to the first control state if the operator leaves the operator's seat 21 with the second control state being left over. Even if the former operator leaves the second control state uncanceled upon operator shifting, for example, it is therefore possible to have the control state returned beforehand to the first control state before the shifted operator rides on the work machine. Accordingly, any travel not intended by the operator can be avoided as in the above-described first embodiment even if the shifted operator carelessly operates the F-N-R control member 40a.

Especially in the second embodiment, when the F-N-R control member 40a is held at the forward position or reverse position, even a turn-on of the selector switch 41 does not bring the power transmission means into the state that forward/reverse switching of the work machine can be performed by the F-N-R switch unit 40 (the second control state). It is, therefore, possible to avoid such a situation that the work machine suddenly travels as a result of a turn-on of the selector switch 41 with the F-N-R control member 40a being held at the forward position or reverse position.

Especially in the second embodiment, after the power transmission means has been brought into the state that forward/reverse switching of the work machine can be performed only by the F-N-R lever unit 30 (the first control state), a switching instruction by the selector switch 41 does not become effective unless the switching control member 41a is switched again to the "ON" position subsequent to its switch to the "OFF" position. Accordingly, when the F-N-R lever 30a of the F-N-R lever unit 30 is shifted to the neutral position N with the switching control member 41a of the selector switch 41 being held at the "ON" position, it is possible to avoid a switch of the power transmission means into the state that forward/reverse switching of the work machine can be performed by the F-N-R switch unit 40.

Especially in the second embodiment, the switching control member 41a of the selector switch 41 is held at the "ON" position or "OFF" position, and the F-N-R control member 40a of the F-N-R switch unit 40 is held at the forward position, reverse position or neutral position. By observing which positions the F-N-R control member 40a and switching control member 41a are held at, the operator can hence confirm what instruction has been made.

It is to be noted that, although the F-N-R switch unit 40 comprises a rocker switch in the second embodiment, the present invention is not limited to the use of such a rocker switch. Described specifically, no particular limitation is imposed insofar as the F-N-R control member can be held at the forward position, reverse position or neutral position. For example, a switch provided with a lever-like control member can be employed.

The invention claimed is:

1. A forward/reverse control system for a work machine, said system being provided with a front attachment control lever, a first forward/reverse control means and second forward/reverse control means for instructing forward, reverse or neutral of said work machine, a switching instruction means for instructing a switch from a first control state in which forward/reverse switching control is performed by said first forward/reverse control means to a second control state in which forward/reverse switching control is performed by said second forward/reverse control means, and a control means for controlling said work machine in accordance with an instruction by said first forward/reverse control means, an instruction by said second forward/reverse control means or an instruction by said switching control means, and said control means being set such that with an operation of said first forward/reverse control means, said second control state is cancelled to return to said first control state, wherein:

said system is provided, in addition to said first forward/reverse control means, with a cancellation instructing means for instructing a cancel of said second control state, said second forward/reverse control means is disposed in the vicinity of but not on the front attachment control lever, said control means is set such that in accordance with an instruction of a cancel by said cancellation instructing means, said second control state is cancelled to return to said first control state, and wherein:

said first forward/reverse control means comprises a control lever unit having a control lever that is shiftable to a forward position that instructs forward, a reverse position that instructs reverse, or a neutral position that instructs neutral and maintainable at said forward position, reverse position or neutral position;

said second forward/reverse control means comprises a switch unit having a control member that is shiftable to a forward position that instructs forward, a reverse position that instructs reverse or a neutral position that instructs neutral and maintainable at said forward position, reverse position or neutral position, said switching instruction means comprises another switch unit comprising said cancellation instructing means and another control member that is shiftable to a switching state in which a switch from said first control state to said second control state is instructed or to a cancellation state in which a cancel of said second control state is instructed and is maintainable in said switching state or cancellation state;

said control means is set such that, when neutral has been already instructed by both of said first forward/reverse control means and said second forward/reverse control means upon switching of said switching instruction means to said switching state, said first control state is switched to said second control state; and said switching instruction means is set such that, upon switching to said first control state by an operation of said first forward/reverse control means with said switching instruction means having been already switched to said switching state, any instruction by said switching instruction means is canceled until said switching instruction means is switched to said cancellation state.

2. A forward/reverse control system according to claim 1, wherein:

said second forward/reverse control system is provided with a use determination means for determining whether or not said second forward/reverse control means is in use; and said control means is set such that, when said switching instruction means is in a state already switched to said switching state and said second forward/reverse control means is not determined to be in use by said use determination means, said second control state is cancelled to return to said first control state.

3. A forward/reverse control system according to claim 2, wherein said use determination means comprises a seat occupancy detection means for detecting whether or not an operator is in occupancy of an operator's seat, and determines that said second forward/reverse control means is not in use when no seat occupancy is detected by said seat occupancy detection means.

* * * * *